United States Patent [19]

Mastenbroek et al.

[11] Patent Number: 5,145,947
[45] Date of Patent: Sep. 8, 1992

[54] COPOLYMERIZATION OF CO/OLEFIN BY TRANSMITTING POWER TO POLYMER SLURRY

[75] Inventors: Barend Mastenbroek; Leonardus Petrus; Gerrit G. Rosenbrand, all of Amsterdam, Netherlands

[73] Assignee: Shell Oil Company, Houston, Tex.

[21] Appl. No.: 676,159

[22] Filed: Mar. 27, 1991

[51] Int. Cl.$^5$ .............................................. C08G 67/02
[52] U.S. Cl. .................................................. 528/392
[58] Field of Search ........................................ 528/392

[56] References Cited

U.S. PATENT DOCUMENTS

| | | | |
|---|---|---|---|
| 3,694,412 | 9/1972 | Nozaki | 260/63 |
| 4,778,876 | 10/1988 | Doyle et al. | 528/392 |
| 4,818,810 | 4/1989 | Drent | 528/392 |
| 4,835,250 | 5/1989 | Drent | 528/392 |
| 4,868,282 | 9/1989 | Van Broekhoven et al. | 528/392 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 339744 | 11/1989 | European Pat. Off. . |
| 340844 | 11/1989 | European Pat. Off. . |
| 360359 | 3/1990 | European Pat. Off. . |
| 361623 | 4/1990 | European Pat. Off. . |

*Primary Examiner*—Harold D. Anderson

[57] ABSTRACT

An improved process for the production of linear alternating polymers of carbon monoxide and at least one ethylenically unsaturated hydrocarbon in a large scale reactor equipped with a stirring device under polymerization conditions in the presence of a catalyst composition and liquid reaction diluent, which is characterized by the provision of a certain minimum power density by the stirring device to the polymer suspension formed during polymerization. The linear alternating polymer so produced will have an improved bulk density.

9 Claims, No Drawings

COPOLYMERIZATION OF CO/OLEFIN BY TRANSMITTING POWER TO POLYMER SLURRY

FIELD OF THE INVENTION

This invention relates to an improved process for the large scale production, in liquid phase, of linear alternating polymer of carbon monoxide and at least one ethylenically unsaturated hydrocarbon. More particularly, the invention relates to an improved process for the production of such polymers through regulation of the power density of a stirring device used to agitate the product slurry during continuing polymerization.

BACKGROUND OF THE INVENTION

The production of linear alternating polymers of carbon monoxide and at least one ethylenically unsaturated hydrocarbon has been known for some years. Nozaki, U.S. Pat. No. 3,694,412, produced such polymers employing arylphosphine complexes of palladium and certain inert solvents. More recent methods for the production of such polymers, now known as polyketones or polyketone polymers, are illustrated by a number of published European Patent Applications including 121,965, 181,014 and 213,671. These processes broadly involve the use of a catalyst composition formed from a compound of palladium, cobalt or nickel, the anion of a strong nonhydrohalogenic acid and a bidentate ligand of phosphorus.

The polyketone polymers are produced in the gas phase, e.g., U.S. Pat. No. 4,778,876, or in a liquid phase in the presence of a liquid diluent. Many if not most polymerizations are conducted in a liquid phase and reactant contact during the polymerization is facilitated by application of some type of agitation of the reaction mixture, frequently stirring.

During a polymerization of this type on a large and possibly commercial scale, a number of factors are important to achieve efficient polymerization. Reaction or polymerization rate, i.e., the rate at which the polymer is produced per unit quantity of catalyst, or of the palladium therein, is obviously important. In general, the faster the reaction rate the larger the quantity of polymer that is produced in unit time. Also important, however, is the bulk density of the polymer product. As a rough approximation, the maximum polymer suspension concentration, i.e., the maximum concentration of polymer product suspended in the reaction medium as polymerization takes place, as expressed in kilograms of polymer per cubic meter ($kg/m^3$) suspension volume, is about one-tenth the bulk density of the polymer product, expressed in $kg/m^3$. For example, producing a polymer having a bulk density of 10 $kg/m^3$ will normally permit a suspension concentration of 100 $kg/m^3$. If the bulk density were increased to 50 $kg/m^3$, a suspension concentration of about 500 $kg/m^3$ could be obtained. Expressed differently, the greater the bulk density of the polymer product, the more polymer is produced in a given reaction volume. Moreover, the recovery and washing of a polymer product is greatly simplified when polymer of high bulk density is produced. For example, a polymer of 100 $kg/m^3$ binds about 5 g of diluent or washing liquid per kg of product, whereas that quantity of liquid is only about 0.25 kg of liquid for a polymer having a bulk density of 500 $kg/m^3$. It is also known that the higher the bulk density of a polymer the more likely it can be used as such without additional processing. It would be of advantage to provide a process for the production of linear alternating polymers of higher bulk density.

SUMMARY OF THE INVENTION

The present invention provides an improved method of producing linear alternating polymer of carbon monoxide and at least one ethylenically unsaturated hydrocarbon. More particularly, the invention provides an improved method for the large scale production of such polymers in the presence of liquid diluent in which the polymer product is characterized by an increased bulk density. The polymer of improved properties is obtained by regulating the power density applied to the product slurry of polymer product in reaction diluent through control of the rate at which the mixture is agitated.

DESCRIPTION OF THE INVENTION

Linear alternating polymers of carbon monoxide and at least one ethylenically unsaturated hydrocarbon having an increased bulk density are produced by applying a minimum power density to a stirred or otherwise agitated suspension of the polymer suspended in the liquid media of its production. The ethylenically unsaturated hydrocarbons which are useful as precursors of the linear alternating polymers have up to 20 carbon atoms inclusive, preferably up to 10 carbon atoms inclusive, and are aliphatic such as ethylene and other α-olefins including propylene, butylene, i-butylene, 1-hexene, 1-octene and 1-dodecene, or are arylaliphatic having an aromatic substituent on an otherwise aliphatic molecule, particularly an aromatic substituent or a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and a second hydrocarbon are produced according to the process of the invention, there will be at least two units incorporating a moiety of ethylene for each unit incorporating a moiety of the second ethylenically unsaturated hydrocarbon. Preferably there will be from about 10 units to about 100 units incorporating a moiety of ethylene for each unit incorporating a moiety of the second hydrocarbon. The polymer chain of the preferred polymers is therefore represented by the following repeating formula

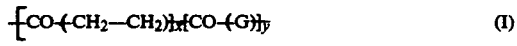  (I)

wherein G is the moiety of a second ethylenically unsaturated hydrocarbon of at least 3 carbon atoms polymerized through the ethylenic unsaturation thereof and the ratio of y:x is no more than about 0.5. When copolymers of carbon monoxide and ethylene are produced by the process of the invention there will be no second hydrocarbon present and the copolymers are represented by the above formula I wherein y is zero. When y is other than zero, i.e., terpolymers are produced, the $—CO—(CH_2—CH_2)—$ units and the $—CO—(G)—$ units are found randomly throughout the polymer chain and the ratio of y:x is from about 0.01 to about 0.1. The end groups or "caps" of the polymer chain will depend upon what materials were present during polymerization and whether and how the polymer has been purified. The precise nature of the end groups is of little significance insofar as the overall properties of the polymer are concerned so that the polymers are fairly represented by the formula for the polymeric chain as depicted above.

Of particular interest are the polymers of the above formula I having a number average molecular weight of from about 1000 to about 200,000, particularly those polymers having a number average molecular weight of from about 20,000 to about 90,000, as determined by gel permeation chromatography. The properties of the polymers will depend in part upon the molecular weight, whether the polymer is a copolymer or a terpolymer and, in the case of terpolymers, the nature of and the proportion of the second hydrocarbon present. Typical melting points for such polymers are from about 175° C. to about 300° C., preferably from about 210° C. to about 270° C. The polymers will typically have a limiting viscosity number (LVN), measured in a standard capillary viscosity measuring device in m-cresol at 60° C., of from about 0.4 dl/g to about 10 dl/g but preferably from about 0.8 dl/g to about 4 dl/g.

The polyketone polymers are produced by the general processes illustrated by the above published European Patent Applications. Although the scope of the polymerization is extensive, a preferred catalyst composition is formed from a compound of palladium, particularly a palladium carboxylate such as palladium acetate, the anion of a non-hydrohalogenic acid having a pKa below 2, e.g., trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The polymerization process is conducted by contacting the carbon monoxide and hydrocarbon reactants under polymerization conditions in a suitable reactor in the presence of a liquid reaction diluent and the catalyst composition. Suitable reaction diluents include alkanols such as methanol or ethanol, and alkanones such as acetone or methyl ethyl ketone. Methanol is a preferred reaction diluent. Polymerization conditions will include a reaction temperature of from about 20° C. to about 150° C. but preferably from about 30° C. to about 135° C. The reactor pressure will customarily be from about 5 bar to about 200 bar, but pressures from about 10 bar to about 100 bar are more frequently employed.

The polymerization to form the polyketone polymers takes place, at least initially, in the liquid phase in the liquid reaction diluent. As polymerization proceeds and polymer product is formed, the initial solution becomes a slurry of polymer product in the reaction diluent. To promote reactant and catalyst composition contacting the product mixture is agitated as by stirring or shaking. Best results are obtained if the polymerization is conducted in a reactor equipped with a stirring device and the reaction/product mixture is stirred during polymerization. The rate of reaction, to some extent, will depend upon the power transmitted to the slurry by the stirring device. This transmitted power, termed "power density", is measured conveniently in kilowatts per cubic meter ($kW/m^3$). As the applied power density increases, the polymerization rate, expressed in kg of polymer produced/g Pd hr, also increases until the rate becomes about 90% of the theoretical maximum value. At this point, further increases in power density have relatively little influence on increasing the reaction rate. Representative relationships between increases in power density and increases in reaction rate in a typical polymerization in a reactor of 100 liters are shown in Table A.

TABLE A

| Change in Power Density, $kW/m^3$ | % Change in Power Density | % Increase in Reaction Rate |
|---|---|---|
| Batch Polymerization | | |
| 0.25 to 0.50 | 100% | 150% |
| 0.50 to 0.75 | 50% | 5% |
| Continuous Polymerization | | |
| 0.50 to 0.75 | 50% | 0% |
| 0.75 to 1.25 | 66% | 0% |

From these data it is observed that increases in power density applied to the polymer suspension above about 0.5 $kW/m^3$ have no substantial benefit. As the cost of stirring is an important factor in the economics of polymerization, particularly when employing large scale reactors, i.e., reactors of more than about 10 liters in volume, there has been little incentive to employ higher power densities. However, when considerations of the bulk density of the polymer product are included, the incentive to employ higher power densities becomes apparent.

The present invention is based on the finding that when the polymerization of carbon monoxide and at least one ethylenically unsaturated hydrocarbon is conducted in the presence of liquid reaction diluent in large scale reactors, i.e., reactors over 10 liters in volume, the bulk density of the polymer product is dependent upon the power density applied by the stirring device, with which the reactor is equipped, to the polymer slurry. Increases in power density above a certain value are reflected in substantial increases in bulk density. For example, when polymerization was conducted in a reactor of 100 liters in volume, substantial increases in bulk density of the polymer product were observed when the power density applied to the polymer suspension was increased above about 1.5 $kW/m^3$. Representative data are shown in Table B.

TABLE B

| Change in Power Density, $kW/m^3$ | % Change in Power Density | % Increase in Reaction Rate | Increase in Bulk Density, $kg/m^3$ |
|---|---|---|---|
| Batch Polymerization | | | |
| 0.5 to 0.75 | 50% | 5% | 180 to 190 |
| 2 to 4 | 100% | 20% | 250 to 300 |
| Continuous Polymerization | | | |
| 0.50 to 0.75 | 50% | 7.5% | 130 to 140 |
| 0.75 to 1.25 | 100% | 50% | 210 to 310 |

Other data relative to these relationships are found below.

Thus, the finding that substantial advantages in polyketone polymerization, i.e., production of polymers of increased bulk density, result from conducting the polymerization at a power density of at least about 1.5 $kW/m^3$. The power density is preferably from about 2 $kW/m^3$ to about 15 $kW/m^3$ and more particularly the power density is from about 2.5 $kW/m^3$ to about 10 $kW/m^3$. The polymerization is conducted in a batchwise operation or in a continuous or semi-continuous manner. When a continuous-type polymerization is utilized, the process is conducted in multiple reactors connected in series but best results are obtained when no more than three reactors are employed. In such a process the minimum power density is provided in one or in all the reactors but if provided in less than all the reactors it is preferred to utilize the minimum power density in the last of the reactors in series.

Subsequent to reaction the polymer product is recovered by conventional techniques. In the case of batch polymerization, the reaction is terminated as by cooling the reactor and contents and releasing the pressure. In continuous polymerization, the product and a portion of the reaction diluent is removed from the last reactor and the temperature and pressure are decreased. The polymer product is separated from the reaction diluent by well known techniques such as filtration or centrifugation. The polymer product is used as obtained or the polymer is purified by contact with a solvent or reaction diluent selective for catalyst residues.

The polyketone product is a thermoplastic material finding utility as a premium thermoplastic polymer. It is processed by techniques conventional for such polymers including extrusion, injection molding and thermoforming into films, fibers and other shaped articles of established utility. Particular applications include the production of containers for food and drink and parts and housings for automotive applications.

The invention is further illustrated by the following Comparative Examples (not of the invention) and the Illustrative Embodiments which should not be regarded as limiting.

COMPARATIVE EXAMPLE I

Into an autoclave having a capacity of 100 liters equipped with a stirring device, 45 kg of methanol, 3 kg of propylene and 0.5 kg of a linear alternating carbon monoxide/ethylene/propylene terpolymer with a bulk density of 270 kg/m$^3$ and a mean particle size of $1.5 \times 10^{-4}$ m were introduced to retard fouling. The autoclave and contents were heated to 80° C. and an equimolar mixture of carbon monoxide and ethylene was introduced until a pressure of 45 bar was reached. The rotational speed of the stirring device was regulated so that the power density was 0.25 kW/m$^3$. A catalyst composition solution was then introduced which comprised 200 ml acetone, 0.75 mmol palladium acetate, 15 mmol trifluoroacetic acid and 0.79 mmol 1,3-bis[di(2-methoxyphenyl)phosphino]propane. During the polymerization the pressure in the autoclave was maintained at 45 bar by continued addition of the equimolar carbon monoxide/ethylene mixture by way of a mass velocity meter. Within about 40 minutes, the mass flow reached a constant value. From that value and the quantity of palladium present in the reactor it was calculated that the polymerization rate at this power density was 1.5 kg of terpolymer/g Pd hr.

Subsequently, by stepwise raising of the rotational speed of the stirring device, the power density was successively raised to 0.5 kW/m$^3$, 0.75 kW/m$^3$ and 1.0 kW/m$^3$. At these values the polymerization rate was determined in similar fashion to be 3.8, 4.0 and 4.0 kg of Pd hr, respectively. From these data it was calculated that the power density needed to reach 90% of the maximum polymerization rate was 0.43 kW/m$^3$.

COMPARATIVE EXAMPLE II

A linear alternating terpolymer of carbon monoxide, ethylene and propylene was produced by a procedure substantially similar to that of Comparative Example I except that the power density was 0.5 kW/m$^3$ throughout the polymerization and after 24 hours the polymerization was terminated by cooling the autoclave and contents to ambient temperature and releasing the pressure. The polymer product was recovered and 7.8 kg of terpolymer having a bulk density of 180 kg/m$^3$ were obtained. The calculated polymerization rate was 3.8 kg of terpolymer/g Pd hr.

COMPARATIVE EXAMPLE III

A linear alternating terpolymer of carbon monoxide, ethylene and propylene was produced by a procedure substantially similar to that of Comparative Example II except that the power density was maintained at 0.75 kW/m$^3$ throughout polymerization. The yield of polymer was 8.0 kg and the polymer had a bulk density of 190 kg/m$^3$. The polymerization rate was calculated to be 3.9 kg of terpolymer/g Pd hr.

COMPARATIVE EXAMPLE IV

A linear alternating terpolymer of carbon monoxide, ethylene and propylene was prepared by a procedure substantially identical to that of Comparative Example II except that the power density was maintained at 1.25 kW/m$^3$ throughout the polymerization. The yield of polymer was 8.1 kg and the polymer had a bulk density of 210 kg/m$^3$. The polymerization rate was 3.9 kg of terpolymer/g Pd hr.

ILLUSTRATIVE EMBODIMENT I

A linear alternating terpolymer of carbon monoxide, ethylene and propylene was produced by a procedure substantially identical to that of Comparative Example II except that the rotational speed of the stirring device was regulated so that the power density was 2.0 kW/m$^3$ throughout the polymerization. The yield of terpolymer was 8.2 kg and the terpolymer had a bulk density of 250 kg/m$^3$. The polymerization rate was 3.9 kg of terpolymer/g Pd hr.

ILLUSTRATIVE EMBODIMENT II

A linear alternating terpolymer of carbon monoxide, ethylene and propylene was produced by the procedure of Comparative Example II except that the power density was maintained at 4 kW/m$^3$ throughout the polymerization. The yield of terpolymer was 8.1 kg and the terpolymer had a bulk density of 300 kg/m$^3$. The polymerization rate was 3.9 kg of terpolymer/g Pd hr.

ILLUSTRATIVE EMBODIMENT III

A linear alternating terpolymer of carbon monoxide, ethylene and propylene was produced by a procedure substantially identical to that of Comparative Example II except that the power density was maintained at 8 kW/m$^3$ throughout the polymerization. The yield of terpolymer was 7.8 kg and the terpolymer had a bulk density of 330 kg/m$^3$. The calculated polymerization rate was 3.8 kg of terpolymer/g Pd hr.

COMPARATIVE EXAMPLES IV-VI

ILLUSTRATIVE EMBODIMENTS IV-VI

In these Comparative Examples and Illustrative Embodiments, linear alternating terpolymers of carbon monoxide, ethylene and propylene were produced in two series-connected reactors with the product mixture of the first reactor being fed continuously together with fresh feed to the second reactor. The catalyst solution contained, for each 1 liter acetone, 1096 mg palladium acetate, 2736 mg 1,3-bis[di(2-methoxyphenyl)phosphino]propane and 5600 mg trifluoroacetic acid. The pressure in the reactor system was maintained constant by discharging excess feed gases from the second reactor. In all cases, the series-connected reactors had virtually the same gas phase composition. The reaction conditions and the results obtained, except for bulk densities, are shown in Table I.

Comparative Examples (CE) IV-VI and Illustrative Embodiments (IE) IV-VI were carried out consecutively in one continuous run, differing only in the power density applied in the second reactor as determined by regulating the rotational speed of the stirring device. The power density of each case and the bulk density of the product are shown in Table II.

TABLE I

| Variable | First Reactor | Second Reactor |
|---|---|---|
| Reactor Volume, liters | 13.6 | 150 |
| Power Density, kW/m$^3$ | 0.5 | See Table II |
| Feed Rates | | |
| Methanol, kg/hr | 6.3 | — |
| Carbon Monoxide, Nl/hr | 250 | 500 |
| Ethylene, Nl/hr | 300 | 900 |
| Propylene, kg/hr | 0.57 | 0.2 |
| Catalyst Comp. Solution ml/hr | 22 | — |
| Temperature, °C. | 80 | 80 |
| Pressure, bar | 45 | 45 |
| Diluent Mass in Reactor, kg | 8 | 60 |
| Pd. Concentration in Reactor, Mg/kg CH$_3$OH | 1.8 | 1.8 |
| Suspension Concentration, % wt. | 1.4 | 13 |
| Polymer Production, | 80 g/h | 0.9 kg/h |
| Polymer Production Rate, kg polymer/g Pd hr | 5.6 | 7.8 |

TABLE II

| Run No. | CE (IV) | CE(V) | CE (VI) | IE(IV) | IE(V) | IE(VI) |
|---|---|---|---|---|---|---|
| Power Density, kW/m$^3$ | 0.5 | 0.75 | 1.25 | 2 | 4 | 8 |
| Bulk Density Terpolymer, kg/m$^3$ | 130 | 140 | 150 | 210 | 310 | 340 |

What is claimed is:

1. In the process of producing a linear alternating polymer of carbon monoxide and at least one ethylenically unsaturated hydrocarbon by contacting the carbon monoxide and the hydrocarbon, in a reactor having a volume above about 10 liters and equipped with a stirring device, under polymerization conditions in the presence of liquid reaction diluent and in the presence of a catalyst composition formed from a compound of palladium, the anion of a strong non-hydrohalogenic acid and a bidentate ligand of phosphorus, the improvement of producing a polymer product with increased bulk density by transmitting power from the stirring device to the polymer slurry in the reactor at a rate of at least about 1.5 kilowatts per cubic meter of polymer slurry.

2. The process of claim 1 wherein the power transmitted is from about 2 to about 15 kilowatts per cubic meter of polymer slurry.

3. The process of claim 2 wherein the power transmitted is from about 2.5 to about 10 kilowatts per cubic meter of polymer slurry.

4. In the process of producing a linear alternating terpolymer of carbon monoxide, ethylene and propylene by contacting the carbon monoxide, ethylene and propylene, in a reactor having a volume above about 10 liters and equipped with a stirring device, under polymerization conditions in the presence of liquid methanol reaction diluent and in the presence of a catalyst composition formed from palladium acetate, the anion of trifluoroacetic acid or p-toluenesulfonic acid and a bidentate ligand of phosphorus selected from 1,3-bis(diphenylphosphino)propane or 1,3-bis-propane, the improvement of producing a polymer product with increased bulk density by transmitting power from the stirring device to the polymer slurry in the reactor at a rate of at least 1.5 kilowatts per cubic meter of polymer slurry.

5. The process of claim 4 wherein the power transmitted is from about 2 to about 15 kilowatts per cubic meter of polymer slurry.

6. The process of claim 5 wherein the power transmitted is from about 2.5 to about 10 kilowatts per cubic meter of polymer slurry.

7. In the process of producing a linear alternating copolymer of carbon monoxide and ethylene by contacting the carbon monoxide and ethylene, in a reactor having a volume above about 10 liters and equipped with a stirring device, under polymerization conditions in the presence of liquid methanol reaction diluent and in the presence of a catalyst composition formed from palladium acetate, the anion of trifluoroacetic acid or p-toluenesulfonic acid and a bidentate ligand of phosphorus selected from 1,3-bis(diphenylphosphino)propane or 1,3-bis[di(2-methoxyphenyl)phosphinopropane, the improvement of producing a polymer product with increased bulk density by transmitting power from the stirring device to the polymer slurry in the reactor at a rate of at least 1.5 kilowatts per cubic meter of polymer slurry.

8. The process of claim 7 wherein the applied power density is from about 2 to about 15 kilowatts per cubic meter of polymer slurry.

9. The process of claim 8 wherein the applied power density is from about 2.5 to about 10 kilowatts per cubic meter of polymer slurry.

* * * * *